United States Patent
Dehnen et al.

(10) Patent No.: US 7,422,159 B2
(45) Date of Patent: Sep. 9, 2008

(54) THERMOSTAT VALVE UNIT

(75) Inventors: Ulrich Dehnen, Kornwestheim (DE); Thomas Kovacs, Bietigheim-Bissingen (DE)

(73) Assignee: Behr Thermot-Tronik GmbH, Kornwestheim (DE)

( * ) Notice: Subject to any disclaimer, the term of this patent is extended or adjusted under 35 U.S.C. 154(b) by 524 days.

(21) Appl. No.: 11/056,981

(22) Filed: Feb. 11, 2005

(65) Prior Publication Data

US 2005/0181647 A1 Aug. 18, 2005

(30) Foreign Application Priority Data

Feb. 13, 2004 (DE) .................. 10 2004 008 456

(51) Int. Cl.
*G05D 23/02* (2006.01)

(52) U.S. Cl. .............. 236/93 R; 236/93 A; 236/99 J; 236/101 R; 123/41.08

(58) Field of Classification Search .......... 236/93 R, 236/101 R, 101 C, 34.5; 123/41.08, 41.09, 123/41.1

See application file for complete search history.

(56) References Cited

U.S. PATENT DOCUMENTS

| 3,858,800 A | | 1/1975 | Wong ..................... 236/34 |
| 4,175,696 A | * | 11/1979 | Braukmann ............. 236/34.5 |
| 4,453,668 A | * | 6/1984 | Abel ....................... 236/34.5 |
| 6,601,544 B2 | | 8/2003 | Frunzetti et al. ......... 123/41.1 |
| 2002/0059906 A1 | * | 5/2002 | Friesenhahn et al. ..... 123/41.1 |

FOREIGN PATENT DOCUMENTS

| DE | 2417897 C2 | 10/1974 |
| DE | 4416240 C1 | 6/1995 |
| DE | 10032354 A1 | 1/2002 |

OTHER PUBLICATIONS

German Search Report.

* cited by examiner

*Primary Examiner*—Marc E Norman
(74) *Attorney, Agent, or Firm*—K&L Gates LLP

(57) ABSTRACT

In connection with a thermostat valve which, together with a housing cover member, constitutes a structural unit, it is provided that a cross arm member is secured on a housing cover by means of a snap-in connection and is provided with flanges extending into a fastening surface of the housing cover member intended for contact with the main housing.

9 Claims, 1 Drawing Sheet

THERMOSTAT VALVE UNIT

FIELD OF THE PRESENT INVENTION

The invention relates to a thermostat valve which, together with a cover-like housing element, constitutes a structural unit and contains a thermostatic operating member, a valve piston operated by the thermostatic operating member, a restoring spring, and a cross arm for supporting the restoring spring.

BACKGROUND OF THE PRESENT INVENTION

In connection with known thermostat valves, holding arms, on whose hook-shaped ends the cross arm is suspended, are attached to the cover-like housing member and project away from it. During operation, these holding arms are subjected to great stresses, so that the cover-like member is made of metal or a high-quality plastic material which can withstand these stresses. It is also known (DE 44 16 240 C1) to provide support elements on the main housing, to which the cover-like housing member is attached, and on which the cross arm is suspended during the assembly of the two housing members, so that the holding arms of the cover-like housing member are relieved. In most cases the main housing is an engine block or the housing of a water pump. Therefore, the manufacturer of the thermostat valve with the cover-like housing member is not the manufacturer of the main housing to which the cover-like housing member is attached. Thus, in many cases it is disadvantageous if the main housing must have a defined shape in order to take on the support function of the cross arm of the cover-like housing member.

SUMMARY OF THE PRESENT INVENTION

The object of the invention is based on assuring a secure support of the cross arm member without the main housing needing to have a defined shape.

This object is attained in that the cross arm member is secured to the main housing by means of a securing device for mounting and is provided with flanges, which extend into a fastening face of the main housing which is placed against a valve housing cover member.

With this embodiment only one securing device for mounting is provided between the cross arm member and the cover member, which assures that the structural component can be transported. Following the installation, when the greater force and also thermal stresses occur, the flanges are clamped between the cover member and the main housing and are fixed in place. This will remain, but forces which would exceed the holding power of the securing device for mounting are transferred to the flanges and are absorbed by the clamped connection between the two housing members.

In an embodiment of the invention it is provided that the cross arm member has side portions extending substantially parallel with the operating piston, and which are provided with detents which have been snapped into a recess of the cover member. In this regard it is advantageously provided that the detents and the recesses form a securing device against relative rotation of the cross arm member and the housing. The cross arm member is sufficiently secured in this way, so that the structural unit consisting of the cover member and the parts of the thermostat valve are capable of being transported.

In a further embodiment of the invention it is provided that the flanges extend outwardly from side portions of the cross member. In this regard it is furthermore provided in an advantageous manner that the housing cover member is provided with extending portions which have the recesses on their exteriors and which are surrounded by the side portions of the cross member extending parallel with the operating piston. It is furthermore suitably provided that the side portions extending parallel with the operating piston are arcurately curved at a curvature centered around the piston and within the main housing. The side portions of the cross arm member are held between the housing cover member and an interior surface of the main housing, so that they cannot yield. Furthermore, by means of the extending portions of the housing cover member, the side portions of the cross arm member center the housing cover member and the structural components received therein in respect to the main housing.

In a further design of the invention it has been provided that the cross arm member with the side portions and the flanges is a punched and shaped sheet metal member. It is possible to realize a cost-effective construction by means of this.

Further characteristics and advantages of the invention ensue from the following description of the embodiment represented in the drawings.

DETAILED DESCRIPTION OF THE PREFERRED EMBODIMENTS

Figure 1:
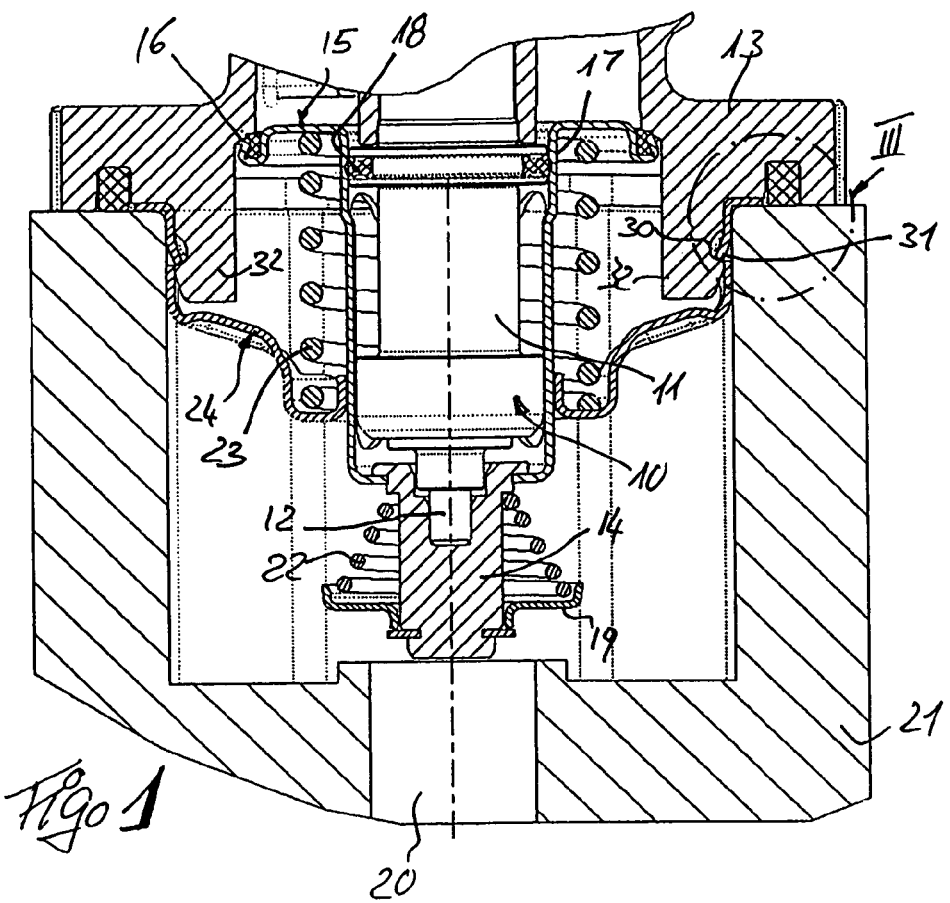
FIG. 1 is an axial cross-sectional view through a thermostat valve unit in accordance with the present invention.

The thermostat valve unit in FIG. 1 contains a thermostatic operating member 10, only partially represented. This thermostatic operating member 10 has a housing 11 in which an expansion material is located. In the course of its expansion, the expansion material, which preferably is a wax mixture set to a selected melting temperature, drives an operating piston 12 out of the housing 11. The housing 11, not fully represented, of the operating member 10 is fixedly supported at a shoulder of a valve housing cover member 13. When the operating piston 12 is extended, it takes along, via an extension 14, a valve disk 15, which cooperates with a valve seat 16 of the housing cover member 13.

In its center area, the valve disk 15 has a substantially cylindrical collar 17, which is sealed against the housing 11 of the operating member 10 by means of an annular seal 18. An area provided with large surface cutouts adjoins the collar 17. This area makes a transition into a base in which the extension 14 is maintained.

Starting at a defined temperature, the operating piston 12 is extended out of the fixedly maintained housing 11 and takes the valve disk 15 along. Then the valve disk 15 is released from the valve seat 16. In addition, the collar 17 is moved out of the area of the sealing element 18, so that a flow-through cross section is also opened here.

A short-circuit plate 19 is displaceably maintained on the insert 14, which is associated with a short-circuit opening 20 of a main housing 21. The main-housing 21 is, for example, the engine block of an internal combustion engine or the housing of a water pump. The short-circuit plate 19 is spring-loaded by a spring 22.

When the thermostatic operating member 10 is cooled off, the valve plate 15 is moved back into the position represented by means of a restoring spring 23. In the course of this the operating piston 12 is pressed back again into the housing 11. The pre-stressed restoring spring 23 is supported by means of a cross arm member 24. The shape of the cross arm member 24 can be seen in FIG. 2, which shows the cross arm member 24 by itself. The cross arm member 24 has a spring disk 25, on which the restoring spring 23 is supported. This spring disk 25 is provided with a collar 26 on its inside, which is used as a guidance device for the area of the valve disk 15 which is provided with the cutouts. Arms 27, which are provided with reinforcement ribs 28, extend from the spring disk 15 on diametrically opposite sides. Each of the arms 27 has a widened side portion 29 extending parallel with the axis of the operating piston 12. These side portions 29 are arcuately curved at a curvature that is centered around the piston within the main housing 21 and, whose exteriors are matched to the inner wall of the main housing 21. The inner surface of the side portions 29 are provided with notched-out detents 30, which are oriented toward the inside. These detents 30 enter into recesses 31 provided in the outer surfaces of the extensions of the housing cover member 32, which project in the direction toward the main housing 21. The recesses 31 have a transverse width which is matched to the width of the detents 30. Therefore the recesses 31, together with the detents 30 of the side portions 29, constitute a securing device against rotation, so that the cross arm member 24 cannot be rotated relative to the housing cover member 13. The exteriors of the side portions 29 are supported on the inner wall of the main housing 21, i.e. following assembly, the sections are maintained between the extensions 32 of the housing cover member 13 and the inner wall of the main housing 21.

Outwardly angled flanges 33 extend laterally from the side portions 29 of the cross arm member 24 extending parallel in respect to the axis of the operating piston 12. The flanges 33 project into the fastening surface of the housing cover member 13 facing a fastening surface of the main housing 21. Thus, the flanges 33 are clamped between the main housing 21 and the housing cover member 13. The fastening surface of the housing cover member 13 is provided with respective cutouts for the flanges 33, whose depth is slightly less than the thickness of the flanges 33. Customarily the housing cover member 13 is fastened by means of screws (not shown) to the main housing 21. In the course of fastening it is assured by means of their dimensions that the flanges 33, are clamped between the main housing 21 and the housing cover member 13. In the area of the fastening surface, the housing cover member 13 is also provided with a cutout, into which an annular sealing ring 34 has been inserted, which is pressed against the fastening surface of the main housing 21.

In the exemplary embodiment, the housing 11 of the thermostatic operating element 10 is fixedly supported. An electrical heating element projects into the housing, so that it is possible to intervene in the temperature regulation executed by the thermostatic operating element because of the expansion material contained in it, in order to increase the flow-through cross section in certain situations and therefore to increase the cooling output.

Figure 2:
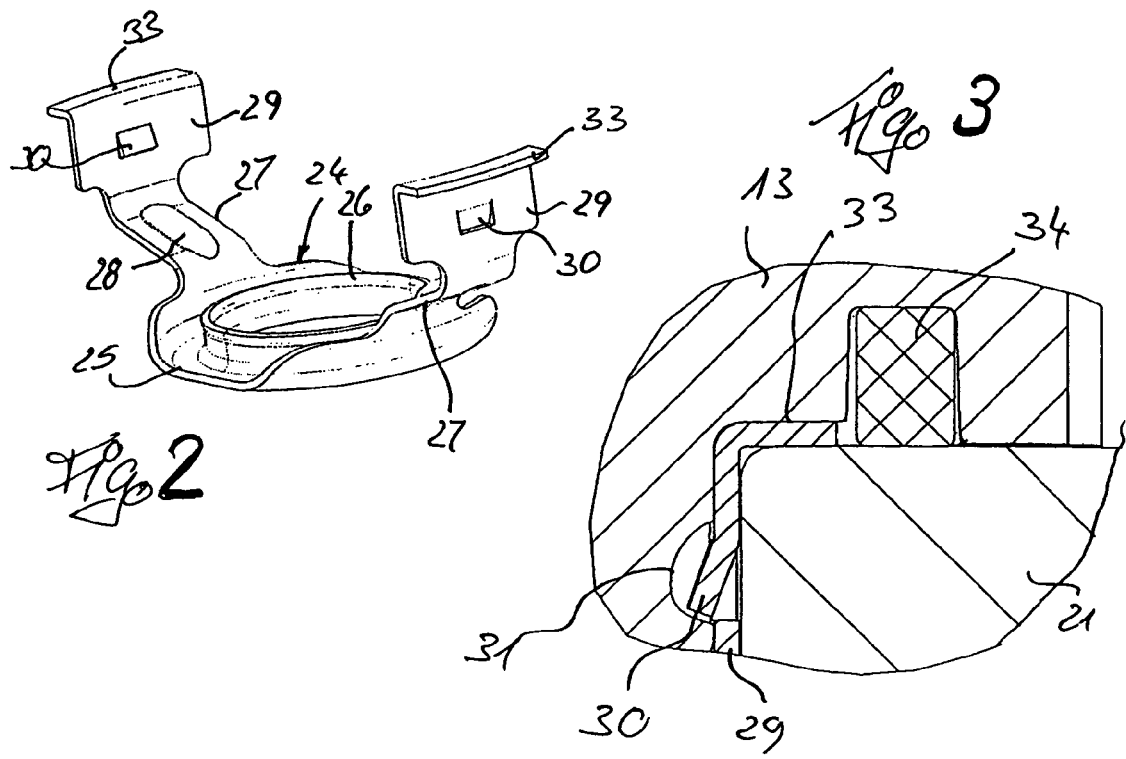
FIG. 2 is a perspective view of a cross arm member for supporting a restoring spring.
Figure 3:
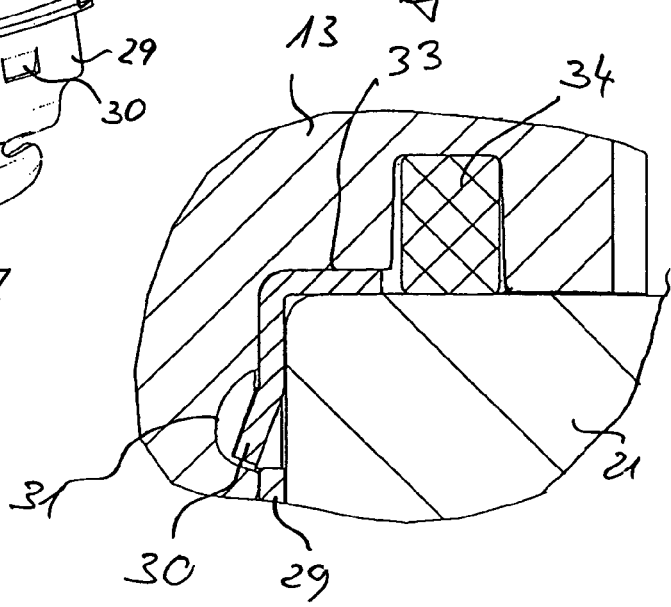
FIG. 3 is an enlarged detail view of the portion circled at III in FIG. 2.

A design of the cross arm member 24 which is similar in principle can of course also be provided in connection with thermostat valves wherein the thermostatic operating member has been arranged in such a way that the operating piston is fixedly supported while the housing, which is provided with one or two valve elements, can be displaced when the operating piston is extended out of the thermostatic operating element. The entire cross arm member 24 in its shape visible in FIG. 2 is produced as a shaped sheet metal member by means of several punching and pressing processes, and it can be reinforced by ribs 28 formed in the arms 27.

What is claimed is:

1. A thermostat valve unit comprising a valve housing, a valve housing cover member, a thermostatic operating member mounted in said housing, a piston operated by said operating member, a restoring spring acting on said piston, a spring supporting cross member mounted across said housing and attached to said cover member by a snap-in connection therewith, said cross member having mounting flanges retained between said housing and said cover member said cross member includes arms having side portions extending along said cover member generally parallel to said piston, and said snap-in connection comprises detents formed in said side portion engageable in recesses formed in said cover member.

2. A thermostat valve unit according to claim 1 characterized further in that said snap-in connection is disposed to prevent relative rotation of said cross member and said cover member.

3. A thermostat valve unit according to claim 1 or 2 characterized further in that said flanges extend laterally outward from said side members.

4. A thermostat valve unit according to claim 3 characterized by said cross member being a punched and shaped sheet metal member.

5. A thermostat valve unit according to claim 1 or 2 characterized further in that said cross member side portions have inner-facing surfaces extending generally parallel to said piston, said cover member has extending portions with outer-facing surfaces facing and extending along said side portion inner-facing surfaces, said recesses being formed in said outer-facing surfaces and said detents being formed in said inner-facing surfaces.

6. A thermostat valve unit according to claim 5 characterized further in that said side portions of said cross member are arcuately curved at a curvature centered around said piston within said valve housing.

7. A thermostat valve unit according to claim 6 characterized by said cross member being a punched and shaped sheet metal member.

8. A thermostat valve unit according to claim 1 characterized further by said cross member being a punched and shaped sheet metal member and said detents being notched out of said sheet metal member.

9. A thermostat valve unit according to claim 1 characterized further by said cross member being a punched and shaped sheet metal member and said arms having reinforcing ribs formed therein.

* * * * *